United States Patent
Williams et al.

(10) Patent No.: US 9,142,960 B2
(45) Date of Patent: Sep. 22, 2015

(54) CONSTRAINT WEIGHTED REGULATION OF DC/DC CONVERTERS

(75) Inventors: Bertrand J. Williams, Austin, TX (US); Sam B. Sandbote, Austin, TX (US)

(73) Assignee: Draker, Inc., Austin, TX (US)

( * ) Notice: Subject to any disclaimer, the term of this patent is extended or adjusted under 35 U.S.C. 154(b) by 662 days.

(21) Appl. No.: 13/020,641

(22) Filed: Feb. 3, 2011

(65) Prior Publication Data
US 2011/0187198 A1 Aug. 4, 2011

Related U.S. Application Data

(60) Provisional application No. 61/301,197, filed on Feb. 3, 2010.

(51) Int. Cl.
*H02J 1/00* (2006.01)
*H02J 1/12* (2006.01)
*H02M 3/02* (2006.01)

(52) U.S. Cl.
CPC .. *H02J 1/12* (2013.01); *H02M 3/02* (2013.01); Y10T 307/653 (2015.04)

(58) Field of Classification Search
CPC .................................. H02J 1/00; H02M 3/02
USPC .......................................................... 307/151
See application file for complete search history.

(56) References Cited

U.S. PATENT DOCUMENTS

| | | | |
|---|---|---|---|
| 5,869,956 A * | 2/1999 | Nagao et al. ................... | 323/299 |
| 6,081,104 A * | 6/2000 | Kern .............................. | 323/268 |
| 6,590,793 B1 * | 7/2003 | Nagao et al. ................... | 363/95 |
| 6,690,590 B2 * | 2/2004 | Stamenic et al. ............... | 363/89 |
| 6,966,184 B2 * | 11/2005 | Toyomura et al. ............ | 60/641.8 |
| 7,045,991 B2 * | 5/2006 | Nakamura et al. ............. | 322/28 |
| 7,091,707 B2 * | 8/2006 | Cutler ........................... | 323/268 |
| 7,158,395 B2 * | 1/2007 | Deng et al. ..................... | 363/95 |
| 7,256,566 B2 * | 8/2007 | Bhavaraju et al. ............ | 320/101 |
| 7,324,361 B2 * | 1/2008 | Siri ................................ | 363/95 |

(Continued)

OTHER PUBLICATIONS

"New Solar Panels," Solar Power, http://www.otherpower.com/otherpower_solar_new.html, 4 pages. (Retrieved Nov. 17, 2008).

(Continued)

*Primary Examiner* — Adi Amrany
(74) *Attorney, Agent, or Firm* — Meyertons Hood Kivlin Kowert & Goetzel, P.C.; Jeffrey C. Hood

(57) ABSTRACT

A converter unit to improve overall recovered power in a photovoltaic array configuration. Each photovoltaic panel in the photovoltaic array may be coupled to a respective converter unit, which may include a controller to sense an output voltage and output current produced by the solar panel, and manage the output voltage of a corresponding power converter to optimize and regulate the resultant bus voltage to a point which reduces overall system losses, maintains a low loss condition, and removes series-string non-idealities when the panels are series connected. The controller may also adapt to output condition constraints. Instead of single-port regulation, a combination of input voltage and output voltage management and regulation may be performed within the converter. The source voltage and current characteristic may be shaped to correspond to an optimized power curve at the desired bus voltage to allow MPPT tracking according to the DC voltage bus. The optimized power curve may be tracked to hold the DC-bus voltage at the desired operating point.

17 Claims, 8 Drawing Sheets

(56) References Cited

U.S. PATENT DOCUMENTS

| | | | |
|---|---|---|---|
| 7,479,774 B2* | 1/2009 | Wai et al. | 323/284 |
| 7,768,155 B2 | 8/2010 | Fornage | |
| 7,839,025 B2* | 11/2010 | Besser et al. | 307/99 |
| 7,859,241 B2 | 12/2010 | Yoshida et al. | |
| 7,960,870 B2* | 6/2011 | Besser et al. | 307/151 |
| 7,986,539 B2* | 7/2011 | Fornage | 363/74 |
| 8,013,472 B2* | 9/2011 | Adest et al. | 307/77 |
| 8,018,748 B2* | 9/2011 | Leonard | 363/95 |
| 8,093,756 B2* | 1/2012 | Porter et al. | 307/72 |
| 8,139,382 B2* | 3/2012 | Zhang et al. | 363/41 |
| 8,184,460 B2* | 5/2012 | O'Brien et al. | 363/97 |
| 8,289,742 B2* | 10/2012 | Adest et al. | 363/71 |
| 8,319,378 B2* | 11/2012 | Fornage | 307/140 |
| 8,618,692 B2* | 12/2013 | Adest et al. | 307/58 |
| 8,674,668 B2* | 3/2014 | Chisenga et al. | 323/266 |
| 2006/0001406 A1* | 1/2006 | Matan | 320/166 |
| 2007/0221267 A1 | 9/2007 | Fornage | |
| 2007/0235071 A1* | 10/2007 | Work et al. | 136/244 |
| 2007/0236187 A1* | 10/2007 | Wai et al. | 323/222 |
| 2007/0273351 A1* | 11/2007 | Matan | 323/299 |
| 2008/0036440 A1* | 2/2008 | Garmer | 323/299 |
| 2008/0150366 A1 | 6/2008 | Adest et al. | |
| 2008/0179949 A1* | 7/2008 | Besser et al. | 307/24 |
| 2008/0203994 A1 | 8/2008 | Park | |
| 2009/0160258 A1 | 6/2009 | Allen et al. | |
| 2009/0189574 A1 | 7/2009 | Le et al. | |
| 2011/0160930 A1* | 6/2011 | Batten et al. | 700/298 |
| 2011/0298305 A1* | 12/2011 | Chisenga et al. | 307/151 |
| 2012/0080943 A1* | 4/2012 | Phadke | 307/24 |
| 2012/0081937 A1* | 4/2012 | Phadke | 363/95 |
| 2012/0205974 A1* | 8/2012 | McCaslin et al. | 307/18 |

OTHER PUBLICATIONS

Kasemsan Sid and Kenneth A. Conner, "Sequentially Controlled Distributed Solar-Array Power System with Maximum Power Tracking," IEEEAC paper #1001, Version 3, Updated Sep. 30, 2003, 9 pages.

Kasemsan Sid and Kenneth A. Conner, "Parallel-Connected Converters with Maximum Power Tracking," The Aerospace Corporation, Electrical and Electronic systems Department, 2002, 7 pages.

Yan Hong Lim and D.C. Hamill, "Simple maximum power point tracker for photovoltaic arrays," Electronic Letters, vol. 36, No. 11, May 25, 2000, 2 pages.

Windy Dankoff, "Increase Solar Charging with an MMPT Power Tracking Charge Controller," What is MPPT? Explanation of maximum power point tracking, http://www.wholesalesolar.com/Wind/MPPT-article.html, 2 pages. (Retrieved Nov. 17, 2008).

W. Stephen Woodward, "Maximum-Power-Point-Tracking Solar Battery Charger," Electronic Design, Sep. 14, 1998, pp. 114-118.

* cited by examiner

```
960

If (Vout > 50V)  {
  // Output-only regulation
  VinWeight = 0;              ⎫ Out of Bounds
  VoutWeight = 1.0;           ⎬
} else if (Vout > 30V)  {     ⎭
  // Hybrid weighted input-output regulation
  Vinweight = 0.5;            ⎫ High Range
  VoutWeight = 0.5;           ⎬
} else if (Vout > 20V)  {     ⎭
  // Input-only regulation
  Vinweight = 1.0;            ⎫ Preferred Range
  VoutWeight = 0;             ⎬
} else  {                     ⎭
  // Hybrid weighted input-output regulation
  Vinweight = 0.5;            ⎫ Low Range
  VoutWeight = 0.5;           ⎬
}                             ⎭
```

If (Vout > Cp*Vcred)  {
  // Output-only regulation
  setVout (Cp*Vcred);
  Cp = Cp + RequestCredit () ;
} else }
  // Input-only regulation
  ExcessiveVoltage = Vout - Cp*Vcred;
  Cp = Cp - GiveUpExcessCredit (ExcessVoltage/Vcred) ;
}
```

FIG. 14

CONSTRAINT WEIGHTED REGULATION OF DC/DC CONVERTERS

PRIORITY CLAIM AND INCORPORATION BY REFERENCE

This application claims benefit of priority of U.S. Provisional Application Ser. No. 61/301,197 titled "System and Method for Constraint Weighted Regulation of a DC/DC Converter for Solar Array Applications", filed Feb. 3, 2010, and whose inventors are Bertrand J. Williams and Sam B. Sandbote, and which is hereby incorporated by reference in its entirety as though fully and completely set forth herein.

This application also incorporates by reference U.S. patent application Ser. No. 12/314,050 titled "Solar Power Array with Maximized Panel Power Extraction", filed Dec. 3, 2008, and whose inventors are Bertrand J. Williams and Brett A. Raymis, and which is hereby incorporated by reference in its entirety as though fully and completely set forth herein.

BACKGROUND OF THE INVENTION

1. Field of the Invention

This invention relates generally to the field of voltage regulation, and more particularly to the constraint weighted regulation of DC/DC converters for managing a bus voltage generated in a photovoltaic array.

2. Description of the Related Art

Photovoltaic arrays (more commonly known and referred to as solar arrays) are a linked collection of solar panels, which typically consist of multiple interconnected solar cells. The modularity of solar panels facilitates the configuration of solar (panel) arrays to supply current to a wide variety of different loads. The solar cells convert solar energy into direct current electricity via the photovoltaic effect, in which electrons in the solar cells are transferred between different bands (i.e. from the valence to conduction bands) within the material of the solar cell upon exposure to radiation of sufficient energy, resulting in the buildup of a voltage between two electrodes. The power produced by a single solar panel is rarely sufficient to meet the most common power requirements (e.g. in a home or business setting), which is why the panels are linked together to form an array. Most solar arrays use an inverter to convert the DC power produced by the linked panels into alternating current that can be used to power lights, motors, and other loads.

The various designs proposed and developed for solar arrays typically fall into one of two configurations: a low-voltage configuration (when the required nominal voltage is not that high), and a high-voltage configuration (when a high nominal voltage is required). The first configuration features arrays in which the solar panels are parallel-connected. The second configuration features solar panels first connected in series to obtain the desired high DC voltage, with the individual strings of series-connected panels connected in parallel to allow the system to produce more current. Various problems have been associated with both configurations, with the most prolific array configuration being the high-voltage series-string based configuration. The series-string configuration raises the overall distribution DC-bus voltage level to reduce resistive losses. However, in doing so it increases panel mismatch losses by virtue of the series-string being limited by the weakest panel in the string. In addition, the resultant DC-bus voltage has a significant temperature and load variance that makes inversion from DC to AC more difficult. Consequently, many design efforts have been concentrated on improving the efficiency of the collection of electrical power from the array, by mitigating these non-idealities.

Various designs have been proposed and developed for DC/DC (DC-to-DC) converter systems applied to solar arrays. Most of these designs have concentrated on the implementation of Maximum Power Point Tracking (MPPT), which employs a high efficiency DC/DC converter that presents an optimal electrical load to a solar panel or array, and produces a voltage suitable for the powered load. Oftentimes the DC/DC converters are implemented with a switching regulator in order to provide highly efficient conversion of electrical power by converting voltage and current characteristics. Switching regulators typically employ feedback circuitry to monitor the output voltage and compare it with a reference voltage to maintain the output voltage at a desired level. While typical regulation may be satisfactory in most applications, when operating DC/DC converters with photovoltaic/solar panels, the requirements associated with such arrays present additional problems that typical regulation cannot adequately address.

Many other problems and disadvantages of the prior art will become apparent to one skilled in the art after comparing such prior art with the present invention as described herein.

SUMMARY OF THE INVENTION

In one set of embodiments, a control system or controller may be designed to improve the response dynamics and overall recovered power from a string plus branch or fully parallel-coupled solar array configuration. Each solar panel in the solar array may be coupled to a respective controller, which may sense an output voltage and output current produced by the solar panel, and control operation of a power converter (e.g. a DC/DC switching power converter) to output modified voltage and current corresponding to the solar panel into the series string, or into the parallel-connected configuration (an example of which is also provided in U.S. patent application Ser. No. 12/314,050, fully incorporated herein by reference). In one set of embodiments, the controller may include a hardware controller driven by analog or (digital) firmware control systems to regulate the input voltage of each power converter unit under indirect guidance of a Maximum Power Point Tracking (MPPT) controller to optimize and regulate the resultant power and achieve very fast dynamic response to environmental transients. In one set of embodiments, voltage management may be achieved by way of an inner control loop and a corresponding MPPT control system configured as an outer guidance loop. Consequently, solar panel arrays may achieve faster response times to transient events on the power bus that may affect the output and input of the power regulators, thus achieving higher power transfer and recovery levels than traditional MPPT-only based systems.

In most current systems, a control signal (e.g. PWM/Pulse Width Modulated/signal) of switching power converters that are coupled to the solar panels is controlled directly, i.e. parameters indicative of the input and output current and voltage associated with the power converter are used directly to control the duty cycle (value) of the PWM signal in a single loop. In contrast, various embodiments of a novel controller may include an inner loop that controls the duty cycle by monitoring a subset of the parameters (e.g. monitoring input voltage), and very rapidly maintaining desired current and voltage values/levels based on the subset of the parameters. A slower outer loop responsible for performing MPPT may control the reference point to which the inner loop may be regulating. The inner loop may monitor one or more of the inputs (e.g. input-port voltage, input-port current, output-port voltage, or output-port current, referring to ports of the power converter) to perform a regulation function associated with that input. While any one or more of these ports may be monitored, in many embodiments it is sufficient to monitor only one of these ports. For example the inner loop may monitor the input-port voltage, for performing an input voltage regulation function. The dual-loop configuration may thus successfully prevent transients at the output ports from being tracked to the input ports by implementing a sufficiently high bandwidth in the input-port regulating inner loop. To put it another way, the inner loop may rapidly respond to the transients on an output port to hold the input port at a desired (substantially fixed) point, whereas in the single loop configuration (with a slow response) the input port typically tracks the output port during transients, resulting in the input port deviating from its desired value, requiring time to potentially regulate the input port back to its desired state. To put it yet another way, by rapidly adapting the corresponding control signal (in this case a PWM signal) to adjust the input port to return to a desired operating point, the input port becomes desensitized to output modulations.

For example the output port of the power converter coupled to the solar panel may be affected by the DC/AC inverter coupled to the DC bus to which the power converters associated with the solar panels are also coupled. The DC/AC inverter may include a single-stage inverter @60 Hz, and may impress a 120 Hz power waveform onto the DC bus. This 120 Hz power waveform may then get superimposed onto the solar panel. However, by providing an inner control loop having a bandwidth that is faster than 120 Hz, the 120 Hz waveform may be prevented from causing the input port to track the output port during a transient event on the bus at the output of the power regulator. Therefore, the steady-state of the input port may be maintained through faster dynamics, that is, through a response time that is faster than the period corresponding to the frequency of the transient signal. In some embodiments, the inner control loop may operate on the order of 100-200 Hz, or even potentially as high as 1 KHz or more, and the outer control loop may operate on the order of 10-20 Hz with high precision, maintaining the desired MPPT accuracy.

In one set of embodiments, the converter unit coupled to the solar/photovoltaic panel may include a DC/DC converter also capable of adapting to output condition constraints. The DC/DC converter may be driven by analog or digital control systems (e.g. custom circuitry, or firmware driven microcontroller/processor based design, or a combination of both) to manage the output voltage of each unit to optimize and regulate the resultant bus voltage to a point which reduces overall system losses, maintains a low loss condition, and removes series-string non-idealities when the panels are series-connected. In one set of embodiments, instead of single-port regulation (e.g. regulating for the output port only or regulating for the input port only), a combination of input voltage and output voltage management and regulation may be performed within the converter. The source voltage and current characteristic may be shaped to correspond to an optimized power curve at the desired bus voltage (i.e. DC-bus voltage), to allow MPPT tracking according to the DC voltage bus. The optimized power curve may be tracked to hold the DC-bus voltage at the desired operating point.

A method for controlling a power converter coupled to a solar panel to provide an output voltage and an output current to a voltage bus may therefore include monitoring the input voltage and input current of the power converter and monitoring the output voltage and output current of the power converter, and regulating the input voltage of the power converter according to an MPPT algorithm using parameters corresponding to the monitored input voltage, monitored input current, monitored output voltage, and monitored output current of the power converter, as well as regulating the output power of the power converter to effect a shaped power transfer characteristic on the voltage bus to sufficiently resemble a power transfer characteristic of the solar panel.

In one set of embodiments, a converter unit may include a power converter having an input to couple to a solar panel to receive an input voltage and input current from the solar panel, and having an output to couple to a voltage bus to provide a converter output voltage and a converter output current to the voltage bus. The converter unit may also include a control unit having one or more input ports, each given input port of the one or more input ports receiving a parameter from a set of parameters that include a first parameter indicative of an input current of the power converter, a second parameter indicative of an input voltage of the power converter, a third parameter indicative of the converter output voltage, and a fourth parameter indicative of the converter output current. The control unit may further include a controller to regulate the input voltage of the power converter according to a first function, while regulating the output power of the power converter according to a second function. The first function may be an MPPT algorithm, while the second function may be a mathematical function of the output voltage of the power converter, and may be intended to effect a shaped power transfer characteristic on the voltage bus that resembles a power transfer characteristic of the solar panel.

A system for harnessing photonic energy to provide power to one or more loads may include a number of solar power panels, each given solar panel of the plurality of solar panels providing a respective output current and a respective output voltage. The system may further include a DC voltage bus providing a DC bus voltage, and a number of converter units coupled to the DC voltage bus, each converter providing a respective converter output voltage to the DC voltage bus. Each given solar panel may be coupled to a corresponding converter unit (of the number of converter units) to provide its respective output current and its respective output voltage as inputs to its corresponding converter unit. Each corresponding converter unit may include a switching power module that produces a respective converter output voltage and respective converter output current. Each corresponding converter unit may regulate an input voltage of its switching power module according to an MPPT algorithm adapted to receive various parameters as inputs. These parameters may respectively correspond to the input voltage and input current of the switching power module, and the respective converter output voltage, and the respective converter output current provided by the corresponding converter unit. Each corresponding converter unit may also regulate the output power of the switching power module according to a function of the respective converter output voltage. The system may also include a DC/AC inverter that inverts the DC bus voltage to an AC power signal for distribution to one or more AC loads. The converter units may be series connected to the D voltage bus via their respective outputs, and/or they may be parallel connected to the D voltage bus via their respective outputs.

Other aspects of the present invention will become apparent with reference to the drawings and detailed description of the drawings that follow.

BRIEF DESCRIPTION OF THE DRAWINGS

The foregoing, as well as other objects, features, and advantages of this invention may be more completely understood by reference to the following detailed description when read together with the accompanying drawings in which:

FIG. 13 shows a pseudo-code implementation of one embodiment of the control function shown in FIG. 10, with static constraints;

FIG. 14 shows a pseudo-code implementation of one embodiment of $F(V_o)$ of the control function shown in FIG. 10, with dynamic constraints.

Figure 1:
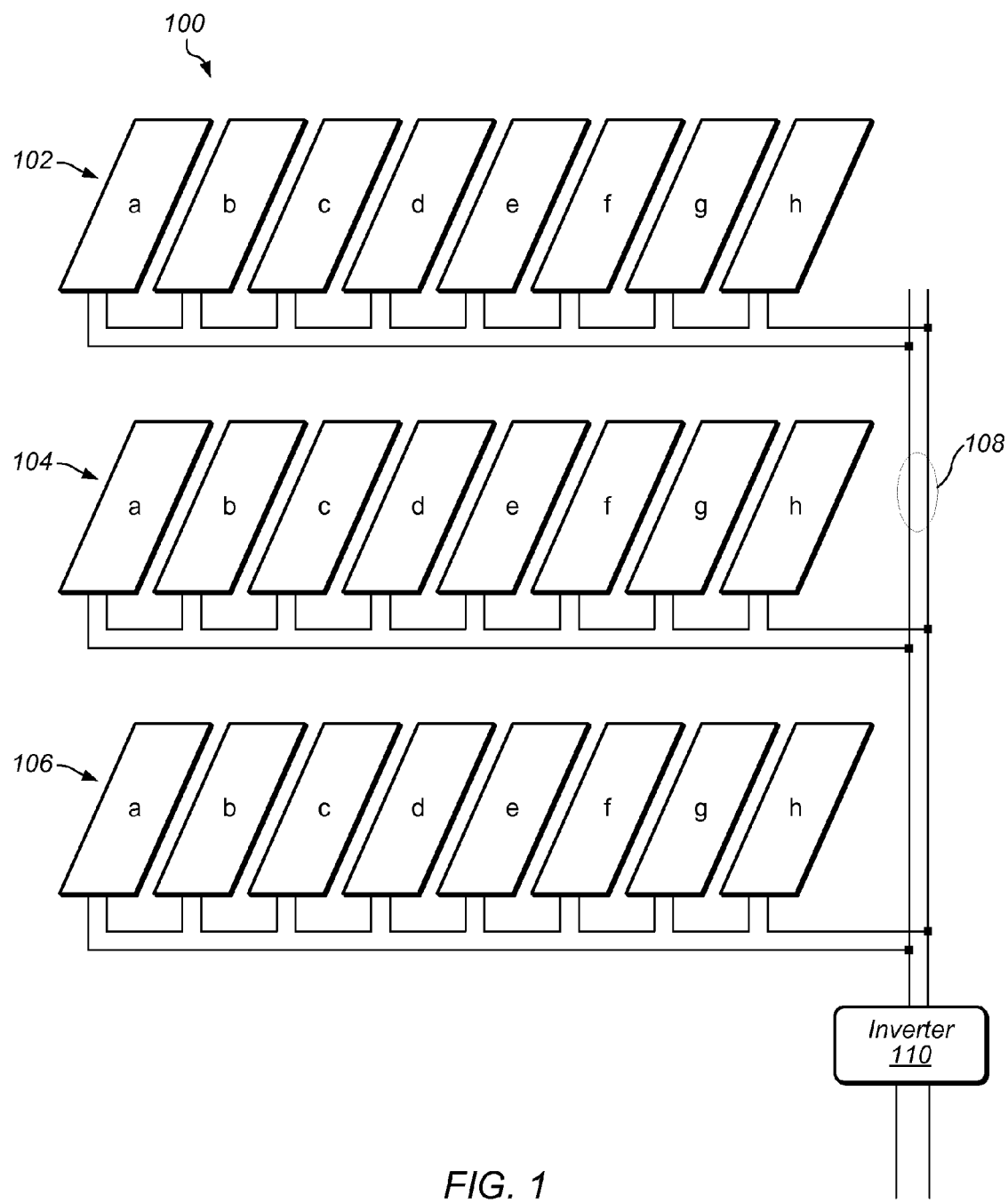
FIG. 1 shows an example diagram of a conventional series-string and parallel branch solar array configuration.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

In solar array systems, many non-idealities may be mitigated by utilizing distributed Maximum Power Point Tracking (MPPT). Distributed MPPT usually includes insertion of a DC/DC converter or a similar power converter behind solar panels in the array, most commonly behind each and every solar panel in the array, to adapt the coupled solar panel's power transfer onto a high-voltage bus (typically a high-voltage DC bus) which connects the panels together via the DC/DC converters. A typical solar array 100 is shown in FIG. 1. Solar panel series-strings 102, 104, and 106 are coupled in parallel to bus 108, which may be a DC/DC bus. Each solar panel series-string includes solar panels a-h coupled in series to a respective bus, each of those respective buses coupling to bus 108 as shown to obtain parallel-coupled solar panel series-strings. An inverter 110 is coupled to bus 108 to ultimately drive a connected load, which may be coupled to the output of inverter 110.

Figure 3:
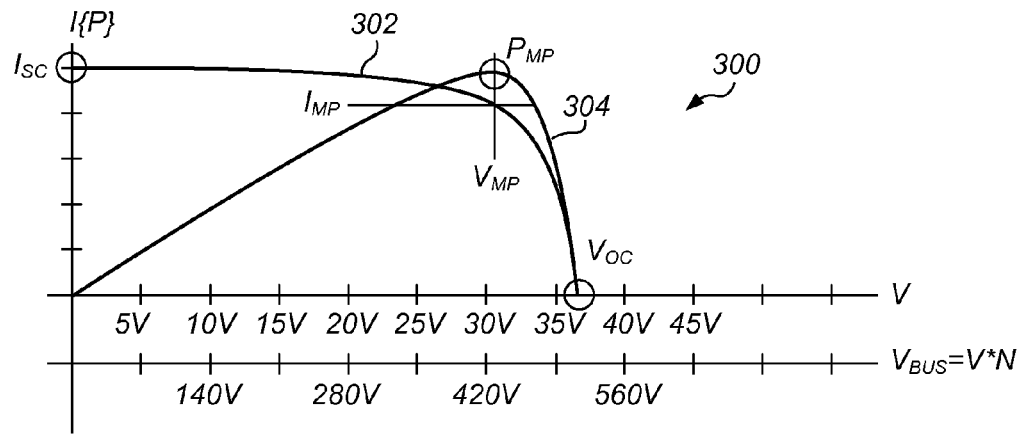
FIG. 3 shows an example V/I power curve for a series-string solar array configuration.

An example of the V/I (voltage/current) characteristic for each solar panel is shown in FIG. 3. As seen in FIG. 3, the V/I characteristic may be modeled as a current source in parallel with a multiplied shunt diode, where the current is proportional to the solar insolation levels, and the shunt diode is the result of the solar cell diode in each cell multiplied by the number of cells in series which make up that solar panel. Curve 302 represents the V/I curve, that is, the current I output by the solar panel (represented on the vertical axis) for a given output voltage V (represented on the horizontal axis). Curve 304 represents the power curve associated with V/I curve 302, showing the maximum power point $P_{MP}$, that is, the point at which the product of the current and voltage output by the solar panel is at its maximum. These values are indicated as $I_{MP}$ and $V_{MP}$, respectively, and $I_{MP}*V_{MP}=P_{MP}$. $V_{OC}$ indicates the open circuit voltage output by the solar panel, that is, the voltage output by the solar panel when not providing current to a load. Similarly, $I_{SC}$ indicates the short circuit current output by the solar panel, that is, the current output by the solar panel with its output terminals shorted together. $V_{BUS}$ indicates the total voltage that appears on the bus for N solar panels connected in the series-string.

Figure 4:
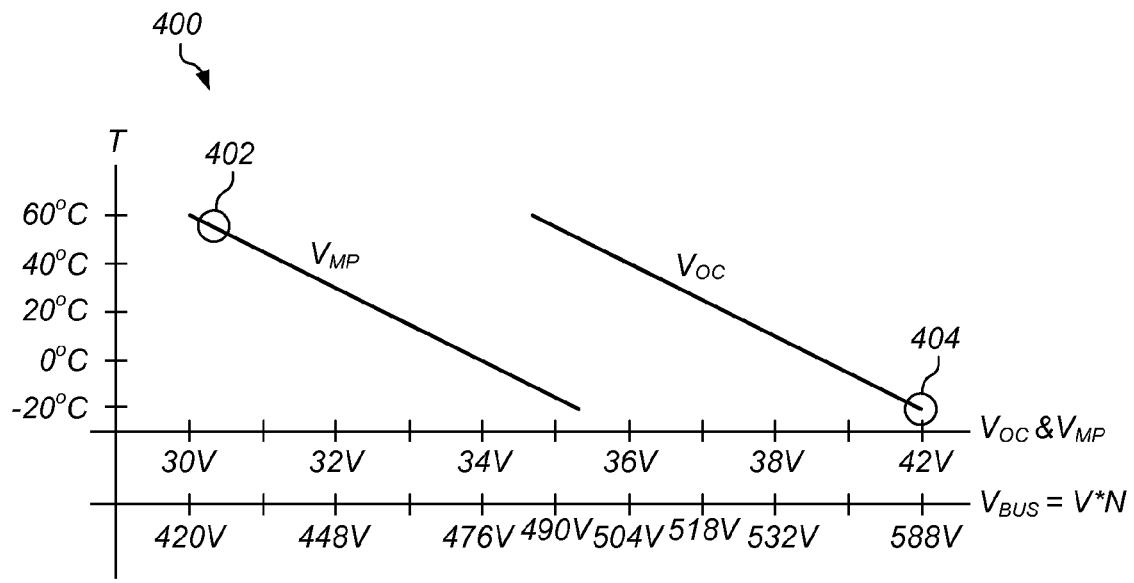
FIG. 4 shows an example $V_{OC}$ & $V_{MP}$ vs. temperature curve for a typical solar panel.

Turning now to FIG. 4, the open circuit voltage $V_{OC}$ of the solar panel may be set by the current—generated as a result of solar insolation—shunted by the series multiplied diode elements. As determined by the shunt diodes within the cell, this voltage may exhibit temperature variance similar to a silicon diode junction. The $V_{OC}$ for a solar panel may thus increase with decreasing temperature, and vice-versa, as indicated by the $V_{OC}$ curve shown in FIG. 4. Consequently, in order for the maximum bus voltage (maximum $V_{BUS}$) to comply with NEC (National Electrical Code) standards, the number of solar panels that may be connected in series at a given site needs to be determined based on the expected coldest temperature at that site. The bus specification usually limits the maximum value of $V_{BUS}$ to 600V in a US NEC compliant system. It should also be noted that at high temperatures, and while under load, the bus voltage may be substantially lower than the allowed operating level for the Bus. Point 402 on the $V_{MP}$ curve indicates the typical $V_{MP}$ condition, and point 404 on the $V_{OC}$ curve indicates a typical $V_{OC}$ condition.

Use of a properly designed respective adaptive DC/DC converter coupled to each solar panel in a solar panel array allows for modification of the curves shown in FIG. 4, under algorithmic control of the DC/DC converters. In order to calculate how many panels may be placed in series, the following equation may be used:

$$N=\text{Integer}(V_{BUS\text{-}max}/V_{OC\text{-}p}), \quad (1)$$

where $V_{BUS\text{-}max}$ is the maximum value of $V_{BUS}$, e.g. 600V when observing NEC standards, and $V_{OC\text{-}p}$ is the maximum value of $V_{OC}$ for any given panel utilized in the array, at the minimum site location temperature. For example, if $V_{BUS\text{-}max}$=600V, and $V_{OC\text{-}p}$=42V:

$$N=\text{Integer}(600V/42V)=\text{Integer}(14.28)=14. \quad (2)$$

Therefore, 14 panels of this type may normally be placed in series for a cold temperature $V_{BUS-OC}=~14*42V=588V$. According to the V/I curve 402, which corresponds to high temperature and operation at the maximum power point, in FIG. 4, $V_{MP}$ at 45° C. is close to 30.5V, resulting in a bus voltage value of $V_{BUS}=~14*30.5V=427V$ under normal operating conditions for this example.

During normal operation, each panel may therefore contribute ~32V to the total bus voltage for the solar panel array string under. Assuming a case of shading, damage, or extreme mismatch, which may result in a given percentage of the solar panels in each string not providing normal power, the $V_{MP}$ bus voltage level may decrease by the amount that the given percentage of the solar panels fails to provide. For example, 20% of the solar panels in a given series-string failing to function normally may lead to a normal operating voltage of the series-string of $V_{BUS}*~80\%=358V$, which represents a substantial drop. If other series-strings (of solar panels) maintain the bus voltage at $V_{BUS}=448V$ under normal conditions, the given series-string may produce no power at all, and may come close to act as a shunt diode load on the high-voltage DC bus (e.g. bus 108 shown in FIG. 1).

In this example, to design a DC/DC converter unit to isolate the panel voltage from the Bus voltage to alleviate the problem, the desired operating points may be specified by determining the number of panels, and thus converter modules, to be connected in series. For $V_{BUS-MAX}$ (i.e. maximum bus voltage) conditions, each converter module may be limited to $V_{O-MAX}=600V/14=42.85V$, comparable to the panel $V_{OC}$, that is, $V_{OC-p}$. Furthermore, each module may be operated sufficiently below this level, to ensure that when a specified percentage (e.g. 15%) of the number of the solar panels are dysfunctional, the remaining modules may successfully boost up their voltage, staying below $V_{O-MAX}$, to compensate for lost voltage in that string. In the specific example provided, the preferred output operating voltage for each DC/DC converter module may thus be expressed as:

$$V_{O-nom} \leq (12/14*42.85V) \leq 36.7V, \text{ and thus,} \quad (3)$$

$$V_{BUS}=36.7V*14=513.8V, \text{ normally.} \quad (4)$$

More generally, the nominal output voltage for each solar panel may be determined by dividing the number of functioning panels by the total number of panels in the series-string, and multiplying the result by the maximum output voltage of each solar panel. In this example, the bus voltage at the normal operating point may be improved by 15%, reducing the DC bus losses by ~32%. The resulting system may therefore become tolerant of two panels in each string becoming non-functional, fully or partially, while maintaining power from the other panels. In cases of less than fully non-functional operation, many of the panels may be degraded substantially for the same recovery level.

Figure 2A:
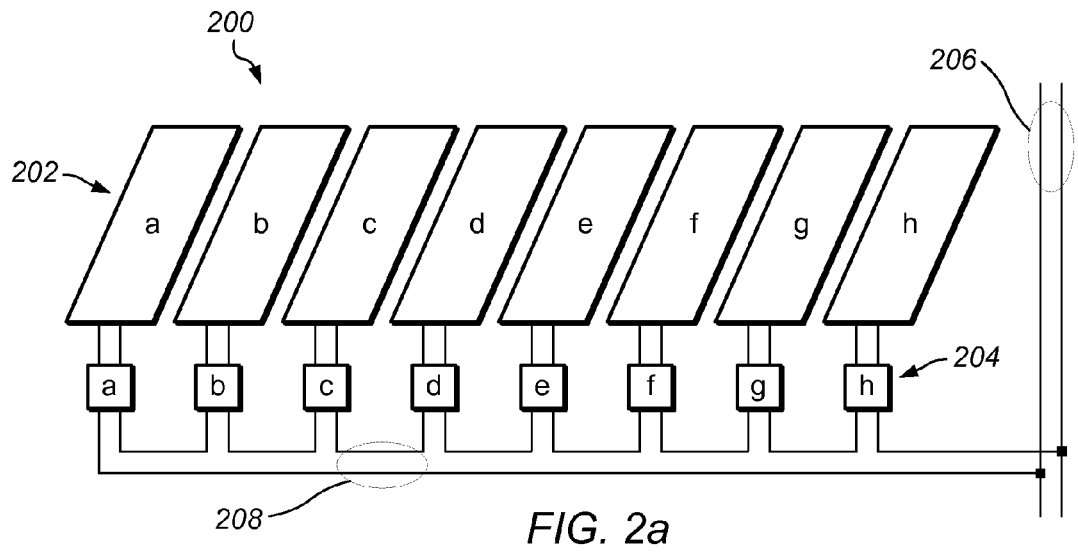
FIG. 2a shows an example of a series-string solar array configuration retrofitted with DC/DC converters attached to the solar panels.
Figure 5:
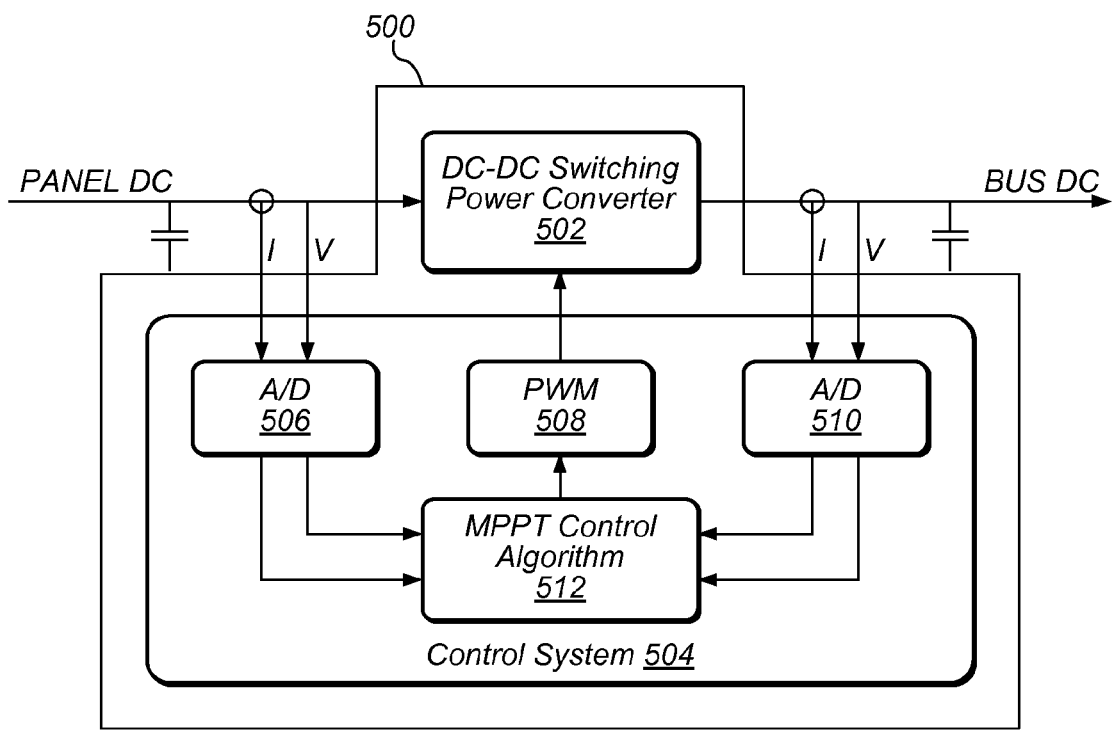
FIG. 5 shows an example Architecture for a direct MPPT controlled DC/DC Converter.

Maximum Power Point Tracking:

FIG. 2a shows one embodiment of a system 200 featuring a solar panel series-string 202, in which each of solar panels 202 a-h is coupled to a respective power converter unit 204 a-h. In this case, power converter units 204 a-h may each include a control unit, and a power converter that provides a voltage for bus 208, and is controlled by the control unit. For example, panel 202a is coupled to power converter and controller 204a, panel 202b is coupled to power converter and controller 204b, and so on. The respective outputs of the power converters and controllers 204 are then series coupled to high voltage DC bus 208, which may be parallel coupled to high voltage DC bus 206. Although not shown, an inverter, such as inverter 110 shown in FIG. 1, may be coupled to bus 206 in system 200, to drive a connected load(s). For the sake of clarity, each power converter and controller will be referred to herein simply as a "converter unit", with the understanding that each converter unit may include a power converter, e.g. a DC/DC switching converter, and all associated control circuitry/unit, e.g. functional units to perform MPPT. Each of the attached converter units 204 may be designed to execute a control algorithm, which may exercise control over a switching power conversion stage. The internal structure of one embodiment of a typical converter unit 500 is shown in the block diagram of FIG. 5. Converter unit 500 may include a control system 504 implementing a single control loop to perform MPPT control of switching converter 502. The input voltage and input current from the solar panel may be sensed and sampled by A/D converter 506, and the output voltage and output current from switching converter 502 may be sensed and sampled by A/D converter 510. These sampled values may be processed using control algorithm 512 to calculate the power, and the duty-cycle of the switching signal provided to switching converter 502. For example, control algorithm 512 may be implemented in hardware, it may be implemented as instructions executed by a microcontroller/processor, or as a combination of both, and may use the sampled values directly to produce the required PWM signal 508 to achieve the conversion characteristics that maintain the solar panel at its maximum power point. It should also be noted, that analog implementation of control system 504 is possible and contemplated, in which case A/D converters 506 and 510 would not be required.

Figure 2B:
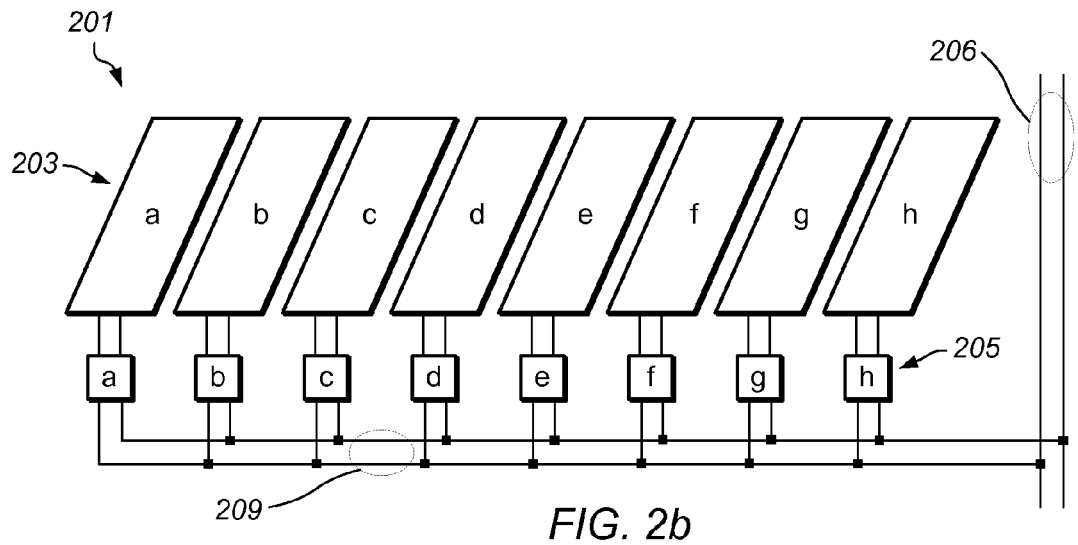
FIG. 2b shows an example of a parallel-string (parallel connected) solar array configuration with DC/DC converters attached to the solar panels.

In alternate embodiments, the respective outputs of the power converters and controllers 204 may be parallel coupled to high voltage DC bus 208, which may be coupled to high voltage DC bus 206. FIG. 2b shows one embodiment of a system 201 featuring a solar panel parallel-string 203, in which each of solar panels 203 a-h is coupled to a respective converter unit 205 a-h. Converter units 205 a-h may also each include a control unit and a power converter providing a voltage for bus 209, and controlled by the control unit. For example, panel 203a is coupled to converter unit 205a, panel 203b is coupled to converter unit 205b, and so on. The respective outputs of the power converters and controllers 205 are then parallel coupled to high voltage DC bus 209, which may be coupled to high voltage DC bus 206. Each of the attached converter units 205 may be designed to execute a control algorithm, which may exercise control over a switching power conversion stage. For a more detailed presentation, please refer to U.S. patent application Ser. No. 12/314,050, fully incorporated herein by reference. Possible embodiments of converter unit 205 are provided in FIG. 5 and FIG. 7. Again, while not shown, an inverter, such as inverter 110 shown in FIG. 1, may be coupled to bus 206 in system 201, to drive a connected load(s).

Many algorithms currently exist for determining and maintaining MPPT operation in a system such as system 200, including Hill Climbing, Zero Derivative, Fuzzy Logic, etc. While such algorithms are applicable to these systems, each has its own advantages and disadvantages. The choice of algorithm type may be determined by a compromise of dynamic tracking characteristics, precision, and/or tracking bandwidth against desired results. Most algorithms may be considered equivalent of each other and equally applicable to a static system. Dynamic conditions typically occur during variable cloud shading and similar events, where the characteristics of the solar panel connected to the converter unit, as well as all of the other solar panels in the string may be affected rapidly. Under these conditions, converter units, such as converter unit 500 shown in FIG. 5, may not be able to provide a satisfactory response time. In one set of embodiments, a novel converter unit may implement a fast algorithm to track the dynamic conditions, and a slow algorithm to maintain accuracy and precision of the MPPT operating point.

Dual-Loop Fast Tracking MPPT:

Possible responses of the converter unit may be categorized as falling into one of two basic categories: a response to provide accurate MPPT, and a response to meet the needs for fast adaptive tracking. One solution may be derived from the unique characteristics of the solar panel V/I curve during most fast transients. A typical transient under consideration might be a cloud passing over the solar panels, producing a variable insolation level transient.

Figure 6:
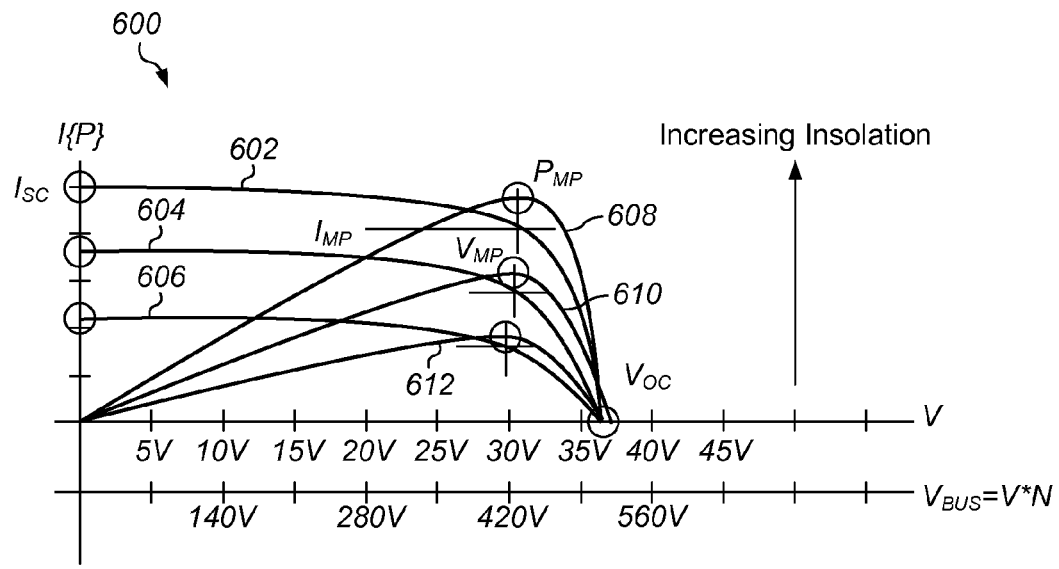
FIG. 6 shows an example V/I Curve for a typical solar panel at different insolation levels.

The graph 600 in FIG. 6 shows V/I curves for a given solar panel under three substantially different insolation levels. V/I curve 602 corresponds to a highest insolation level, V/I curve 604 corresponds to a lower insolation level, and V/I curve 606 corresponds to a lowest insolation level. Power curves 608, 610, and 612 in graph 600 are the power curves corresponding to V/I curves 602-606, respectively. As seen in graph 600, the current I generated by the solar panel is substantially reduced at lower insolation levels. In fact, it is typically the case that the current I is directly proportional to the insolation level. As a result, and as also seen in graph 600, the voltage at which MPPT is achieved remains substantially static, and varies very little over a transient of different insolation levels. In other words, the desired voltage $V_{MP}$ varies minimally, if at all, with respect to changing insolation levels. Consequently, early control systems for solar panels did not include a MPPT mechanism at all, but rather just operated the solar panel at a fixed voltage under all conditions, with the fixed voltage presumed to be near the desired MPPT voltage. However, such systems are not adaptive, and consequently cannot determine what the proper operating voltage for that given panel or string should be. Because of their lack of accuracy, the operation of such systems results in substantially reduced power transfer.

Figure 7:
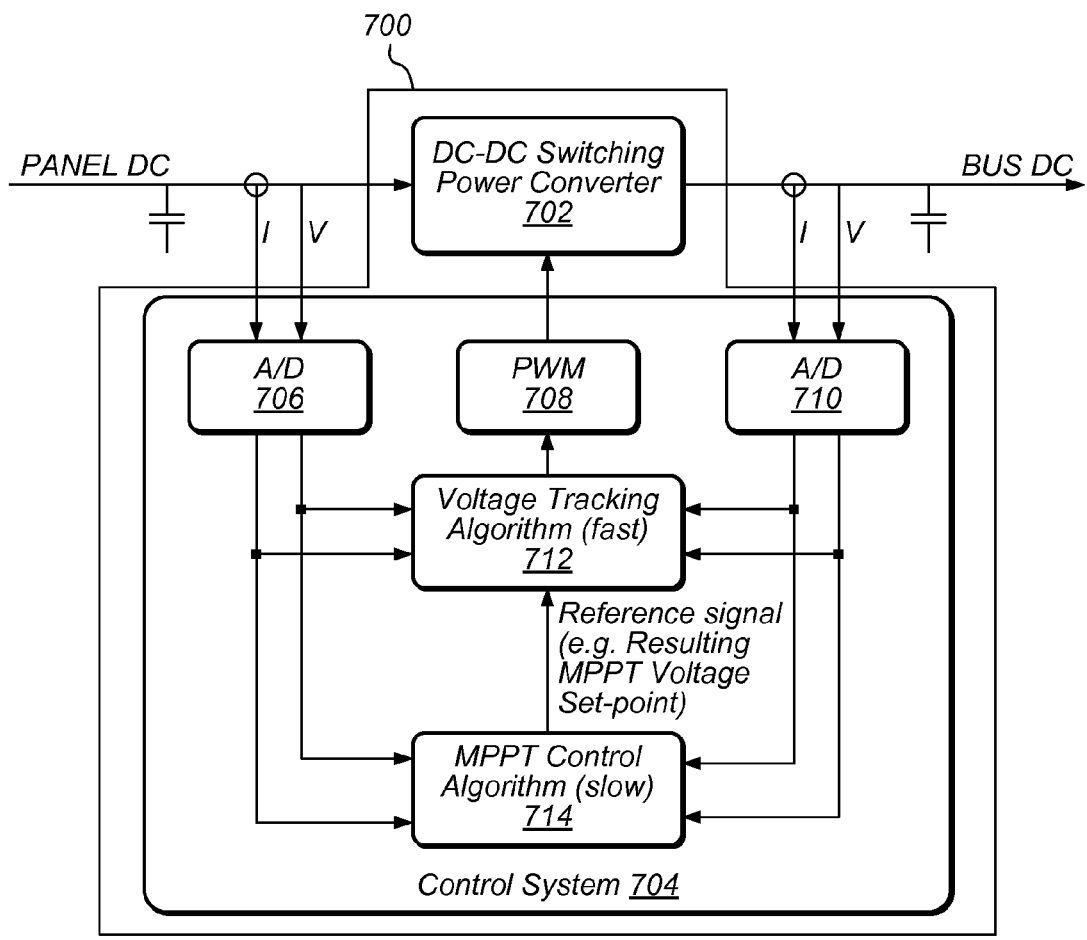
FIG. 7 shows one embodiment of a DC/DC converter controller that features an inner control loop regulating to $V_I$, and an outer MPPT control loop that sets the value for $V_I$.

One embodiment of an improved converter unit and method for achieving a fast response time together with accurate MPPT is shown in FIG. 7. Converter unit 700 may include a fast tracking inner control loop, which may be a fast tracking voltage regulating loop 712, and a slower MPPT tracking loop 714 utilized to set the "Reference" point for the inner control loop 712. In the embodiment shown, the Reference point is the reference voltage for the fast tracking inner control loop 712. The Reference point may be provided by MPPT loop 714 in the form of a control signal, whether analog or digital, to the inner voltage regulating loop 712, to determine what reference point (in this case reference voltage) the control system 704 should regulate to. The inner fast tracking loop 712 may directly control the DC/DC conversion duty-cycle of PWM control signal 708 for switching converter 702, and the outer MPPT loop 714 may continually monitor and average the power conditions to instruct the inner loop 712 what voltage value regulation should be performed to. Again, A/D converter 706 may be used to sense and sample the input voltage and current obtained from the solar panel, and A/D converter 710 may be used to sense and sample the voltage and current output by switching converter 702. However, in case of analog implementations, there is no need for A/D converters 706 and 710. Inner control loop 712 may be designed to monitor one or more of the input-ports (I and V received from the solar panel) and output-ports (I and V received from the output of power converter 702). Accordingly, converter unit 700 may include a total of four input ports, a first pair of input ports to receive input-port voltage and current from the solar panel, and a second pair of input ports to receive output-port voltage and current from power converter 702. It may also include an output port to provide the control signal to power converter 702 via PWM 708.

In one embodiment, fast tracking loop 712 may include a hardware PWM controller generating the PWM control signal 708 using analog and digital hardware functions, for a fully hardware-based control system. In another embodiment, fast tracking loop 712 include a microcontroller based system utilizing A/D and PWM peripherals implementing the fast tracking loop as a combination of hardware and firmware. Choices of embodiments including hardware and/or software implementations or a combination thereof may be based upon cost and performance criteria for the intended system while maintaining equivalence from an architectural perspective disclosed in at least FIG. 7.

MPPT algorithms typically use some form of dithering to determine a derivative of the Power vs. Voltage conditions, or to determine and maintain operation at the maximum power point. In converter unit 700, this dithering may now be performed by control system 704 dithering the reference signal (e.g. the resulting MPPT set-point, which may be an MPPT voltage set-point for regulating the input-port voltage, that is, the voltage input to A/D 706 and into converter 702) to the inner loop 712, rather than by directly modulating the duty-cycle of PWM signal 708. The advantages of the dual-loop structure in converter unit 700 include improved stability of the system, and very fast acquisition and tracking of the system during transients. Other advantages that may also be derived from the architectural partitioning into two control loops include current-mode operation of the inner Vin regulating control system, that is, current-mode operation of the inner control loop 712. Current-mode operation offers several advantages, including excellent tradeoff between stability and tracking speed, over-current protection and limiting, and automatic pulse-skipping during discontinuous-mode operation. Current-mode operation of fast tracking inner loop 712 may be particularly attractive, and easily enabled, when fast tracking inner loop 712 is implemented fully in hardware.

Automatic Pulse Skipping:

Since the efficiency of a power converter is related to the losses in the system compared to the power transferred through the system, it may be advantageous to reduce the losses for a given power level. Losses for a DC/DC converter can typically be lumped into several categories: transistor switching losses, transistor and diode resistive losses, core losses in the magnetics, resistive losses in the magnetics, control power used, and other miscellaneous resistive losses, including current sensing, etc.

In applications where the system is designed for high power levels, and the power is substantially reduced as a result of certain conditions, transistor switching losses may oftentimes become substantially dominant at the reduced, lower power levels. The control algorithm for the PWM controller may be modified to adjust the switching rate or timing at lower power levels to accommodate these conditions. By separating the input voltage regulating loop 712 from the MPPT loop 714, more complex PWM control may be introduced into the design of the inner loop 712. Because regulation in MPPT is in effect performed for optimizing power (specifically finding the maximum power point), a single loop may not be able to easily integrate dependent functions such as dynamic pulse skipping based on current. While it may be possible to implement such functionality in a single loop, it may prove overly difficult to do so, and the complexity and computational burden on microcontroller firmware may have to be substantially increased. Use of certain analog current-mode controllers for implementation of the inner voltage regulation loop 712 may allow natural implementation of low power pulse skipping for properly constructed designs.

DC/DC converter 702 may be designed to take advantage of the fact that the PWM duty-cycle is proportional to the power being transferred in the general case, and as the PWM duty-cycle drops below a predetermined level the on-time of the power output stage of converter 702 may be held constant while the off-time is increased, effectively reducing the switching rate and the related transistor switching losses. In addition, since below a certain lower predetermined duty-cycle value it may no longer be necessary or desirable to hold the on-time constant while decreasing the off-time, the rate may then be held and the duty-cycle again returned to conventional operation down to approaching 0%. This hybrid mode operation allows for optimization of the losses over a much broader range of power levels, especially in the crucial range where the input power is lower than normal. This feature may be implemented as a firmware controlled feature, or it may be implemented directly within analog and/or mixed-signal hardware peripherals to the microcontroller, or it may be implemented based upon a conventional analog current-mode architecture. Furthermore, when the power converters coupled to the solar panels are connected in parallel (e.g. refer to FIG. 2b, and U.S. patent application Ser. No. 12/314,050, fully incorporated herein by reference), fast tracking inner loop may be operated to adjust the output voltage of power converter 702 based on the Reference signal, as opposed to adjusting the input voltage of power converter 702.

Figure 8:
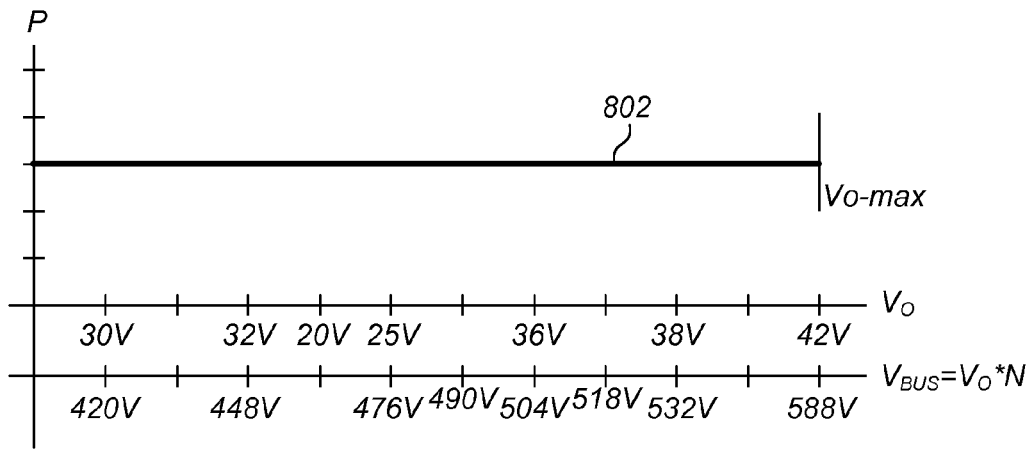
FIG. 8 shows an example power vs. $V_o$ and $V_{BUS}$ curve representing characteristics of a constant power port.

Method of Output Port Management:

In one set of embodiments, a DC/DC switching power converter, such as converters 702 and/or 502, for example), may utilize pulse-based switching of devices connected to magnetic and capacitive elements to create a well controlled power transfer characteristic. The pulse timing may completely determine these transfer characteristics. In general DC/DC converters may be operated as constant-power-transfer devices, where $P_{out}=P_{in}$, (i.e. the output power equals the input power), minus the switching losses and/or other losses incurred in the converter. When a converter is configured to manage the input port, as the MPPT-based converters 500 and 700 may be configured, the output port power tracks the input port power, and the pulse-timing (of the PWM pulse 508 and 708, for example) may be adjusted to adapt to the required conditions at the input port and at the output port for transferring power to the load. This process may create a condition on the output port that causes the output port to operate as a "Virtual Power Port", or "Constant Power Port". In effect, no matter what voltage is established or impressed upon the output port, the power may be the same, as shown in the power vs. voltage diagram in FIG. 8. As indicated in FIG. 8, the power curve 802 may remain constant over output voltage and bus voltage variations, when operating the DC/DC switching converter according to an MPPT algorithm. In other words, the internal pulse-timing may be adjusted to produce the flat power curve 802 seen in FIG. 8. It is therefore important to consider what constrains or determines the bus voltage in a photovoltaic/solar array system.

In a conventional solar array that includes strings of panels, e.g. each string constructed of N panels, and M strings connected in parallel (e.g. as exemplified by array 100 in FIG. 1), the nominal string voltages determine what the value of the bus voltage ought to be for maximum power transfer of the array. Normally, for solar arrays, the inverter (such as inverter 110 in FIG. 1) incorporates MPPT tracking circuitry/mechanism designed to adjust the bus voltage to effect maximum power transfer from the array connected to the bus, as a whole. While each string may preferably be operated at different voltages to obtain maximum power transfer, it may not be possible to do so under a connected bus configuration, as the inverter may attempt to compromise the bus voltage to maximize overall power, if not optimal for a given string. If a DC/DC converter module is attached to each solar panel, as shown in FIGS. 2a and 2b for example, and the output port characteristics result in constant power over a wide range of DC bus voltages, the inverter may not properly track the bus voltage, and the resultant bus voltage may be indeterminate, or unlikely to reside at the desired level. If the DC/DC converter is designed to have a preferential conditioning placed upon its output port to set the preferred output port voltage within a desired range, then the inverter may detect the sum of these preferred operating voltages as the preferred bus voltage where maximum power is transferred from the array to the load.

To put it another way, the inverter connected to the bus may be operated with the expectation of a configuration shown in FIG. 1, where the power may peak at certain locations instead of remaining flat over the output voltage (bus voltage) range. Thus, the MPPT performed by the inverter is not expecting a flat power curve. However, the goal is to move the inverter to operate at a desired bus voltage. With the inverter performing MPPT without accounting for the presence of DC/DC converters between the bus and the solar panels, it may be therefore desirable to shape the power curve, putting emphasis on power vs. $V_{out}$ to allow the inverter to track to a specified voltage for maximum power transfer. In a way, the maximum power curve characteristic (shown in FIG. 3 for a single panel) may be "simulated" or "recreated" as the power characteristic with respect to the entire voltage bus, enabling the inverter to operate according to its MPPT algorithm without having to alter the inverter itself. This principle is illustrated in FIG. 9, which shows a modified power curve characteristic vs. the bus voltage, with three segments: a rising output voltage emphasis segment 902, a flat range segment 904, and a falling output voltage emphasis segment 906.

Figure 9:
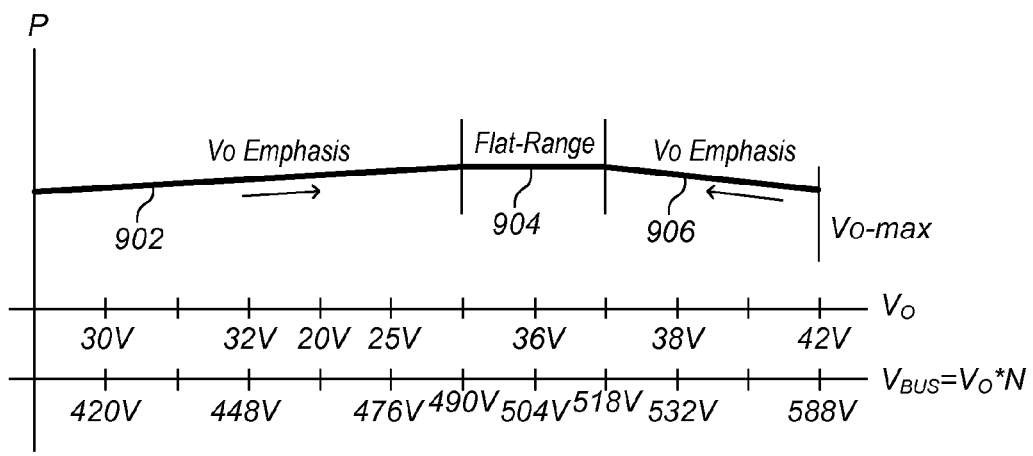
FIG. 9 shows an example power vs. $V_o$ and $V_{BUS}$ curve representing characteristics of a pseudo-constant power port with algorithmically controlled $V_o$ emphasis.
Figure 10:
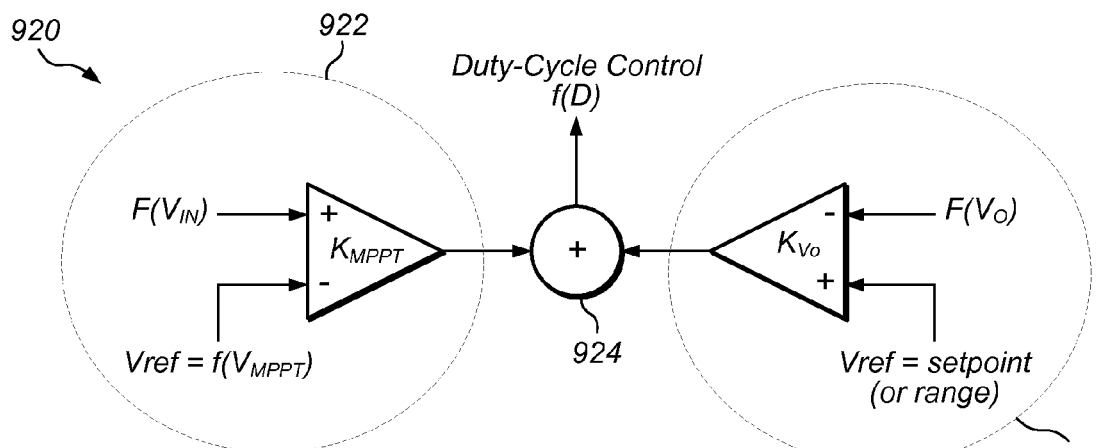
FIG. 10 shows an example of control function for implementation of a joint $V_{in}$ and $V_{out}$ regulation system.
Figure 11:
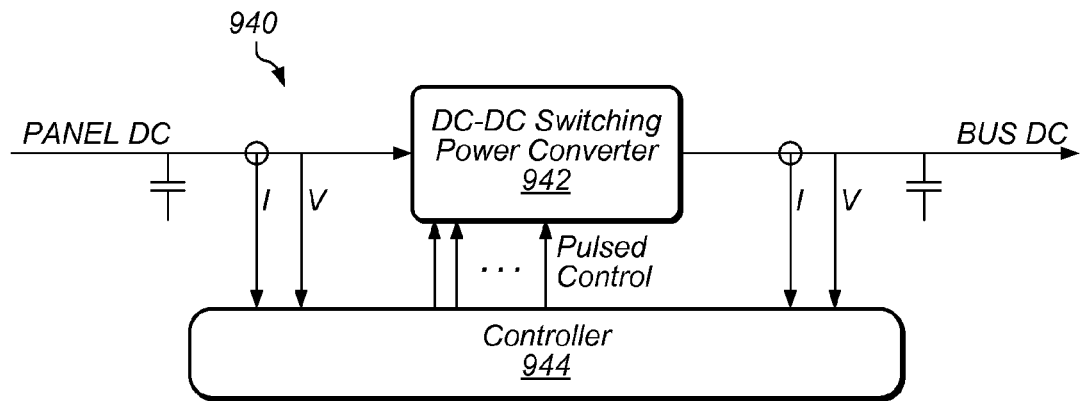
FIG. 11 shows a generalized DC/DC converter architecture.

Mathematically, the preferred output condition shown in FIG. 9 may be obtained by considering the output port as having a weak regulation component based on the output voltage. FIG. 10 shows a control diagram for one embodiment of a control function 920 for controlling the input and the output of a power converter (such as DC/DC power converters 500 and 700). The control function may be applicable and dual-port regulation may be performed when the power converters are series connected (as seen in FIGS. 1 and 2a) and/or parallel connected (as shown in FIG. 2b). As shown in FIG. 10, control function 920 may include two components 922 and 926 that combine to set the value of a control signal used in producing the output voltage of the power converter. In the embodiment shown, the control signal is a PWM signal, with function 920 setting the duty-cycle value of the PWM signal. Component 922 corresponds to the MPPT signal path $[K_{MPPT}*f(V_{MPPT})]$, which may be used to set the dominant pulse-timing, and component 926 corresponds to the output port voltage signal path $[K_{Vo}*f(V_O)]$, which may be used to establish a weak control path to provide "emphasis" (represented by 902 and 906 in FIG. 9) at the flat "Constant Power Port" around a preferred voltage range (represented by 904 in FIG. 9). In concept the emphasis range may be partitioned such that within some fairly narrow range, the power slope remains naturally flat (again, as exemplified by 904 in FIG. 9), and outside that range a gentle emphasis slope may be presented (again, as exemplified by 902 and 906 in FIG. 9) to cause a slight preferential tendency for the system to return to the nominal range, thus achieving the desired overall function. A typical DC/DC converter, such as converter 942 under control of controller 944 shown in FIG. 11, may possess a single input port and a single output port. Converter 942 may be implemented using capacitive, inductive, resistive, and switching components, controlled by pulsed inputs from controller 944. Controller 944 may regularly monitor voltage and current flow on the input and output ports of converter 942, and may control switching converter 942 through pulsed signals according to at least the monitored voltages and current flow. Controller 944 may be implemented in hardware, software, or a combination of both.

Figure 12:
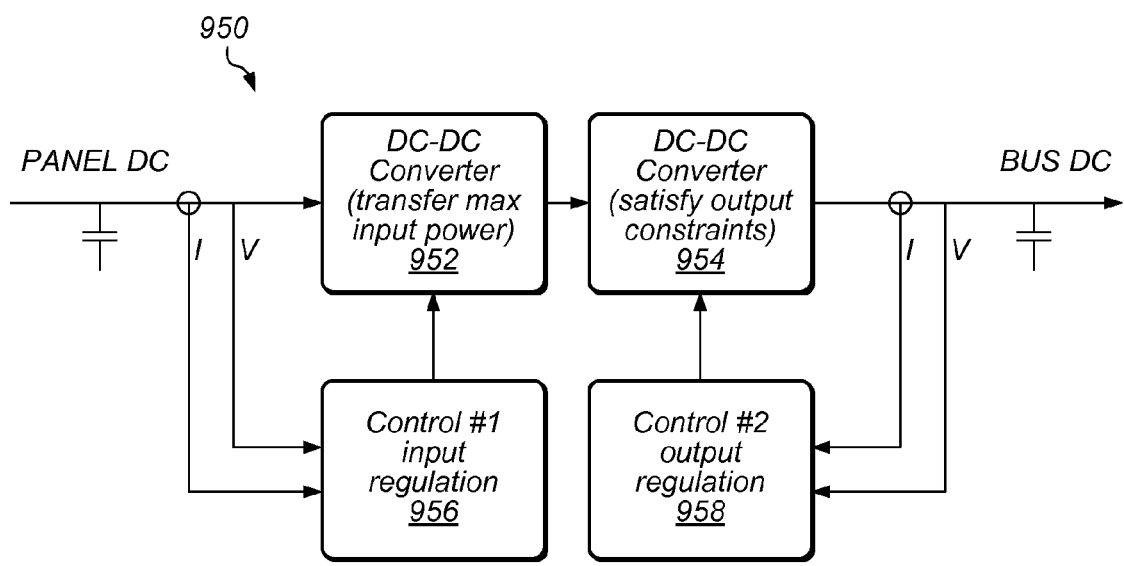
FIG. 12 shows a cascaded DC/DC converter architecture.

FIG. 12 shows one possible embodiment 950 for implementing control function 920 presented in FIG. 9. System 950 may include a cascade of two DC/DC converters, converters 952 and 954, each under control of a respective controller, 956 and 958, respectively. Converter 952 may collect power from a solar panel, constantly adapting to the panel's maximum power point under the control of controller 956. Converter 954 may receive voltage and current from converter 952, and may perform output regulation under control of controller 958 in order to satisfy the output constraints specified for controller 958. While cascaded system 950 satisfies both the desire to collect the maximum power from a solar panel, and the necessity to place a constraint on the output voltage, the cascaded combination of DC/DC converters 952 and 954 results in the respective efficiency losses of converters 952 and 954 being multiplied with each other. Attempting to harness maximum overall system power using cascaded converters may therefore ultimately lead to a net loss as a result of the significant losses experienced in converter modules 952 and 954.

Another embodiment for implementing control function 920 presented in FIG. 9, may include a single DC/DC converter, performing an optimization of input power collection while also satisfying output voltage constraints. An output constraint may be specified as a hard constraint or an elastic constraint. A hard constraint may refer to a constraint that the control system is instructed to meet under all circumstances. One example of a hard constraint may be implied in FIG. 9, which indicates that the output voltage of any individual panel's converter module $V_O$ is to be lower than a maximum value $V_{O-MAX}$. An elastic constraint, by contrast, may provide emphasis (represented by 902 and 906 in FIG. 9) to the control system by means of weighting the constraint as a part of a comprehensive overall control function. For example, a weight may be assigned to the control system's primary goal of optimizing input power, and a weight may also be assigned to the output constraint. While in a stable state the control system may not completely optimize the input power collection, and may not perfectly satisfy the elastic output constraint, as mentioned above, the overall system performance may still be optimized as desired.

Output voltage constraints are one of many constraints that may be applicable in a given system. In one sense, an output-current constraint, either hard or elastic, may resemble the properties of a voltage constraint as described herein. Application of a power constraint may be straightforward also. As previously mentioned, DC/DC converters may be considered to operate as constant power transfer devices, where output power is equal to input power, with any difference between the input power and output powers stemming from switching losses and other losses within the converter. However, a hard constraint or elastic maximum constraint may easily be applied to the output power such that the control system's primary goal of input power optimization is explicitly specified. In one set of embodiments, output constraints may be applied to converter modules in a series string configuration (e.g. as shown in FIG. 1 and FIG. 2a), or in a parallel configuration (e.g. as shown in FIG. 2b) according to at least two methods: static assignment and dynamic assignment.

Static assignment of output constraints may be specified (i.e. applied and/or performed) at system initialization, and the specified static constraint values may not change during normal system operation. FIG. 13 provides a pseudo-code implementation of one embodiment, in which static assignment of hard and elastic output voltage constraints are made. As seen in the example provided in FIG. 13 via the weighting of the input and output constraints that input regulation continually seeks to maximize input power collection. Three output constraints may be applied simultaneously. In the example code of FIG. 13, one hard maximum constraint on the output voltage is provided to limits the output voltage to a maximum value of 50V. In addition, two elastic constraints are provided to keep the output voltage above 20V and below 30V. As shown, there are four ranges of operation defined by four different sets of output constraints.

In a lowest range, $V_{OUT} < 20V$, which violates one of the elastic constraints. Within this range, a weight is given to push $V_{OUT}$ above 20V, which is added when considering the optimization of input power. In a middle range, $20V < V_{OUT} < 30V$, and both elastic and hard output constraints are already satisfied. In this case input regulation may be performed by the controller as long as the maximum input power results in $V_{OUT}$ being within this range. In a third range of operation, $V_{OUT}$ is greater than the elastic maximum of 30V but below the hard maximum of 50V. Similar to operation in the lowest range, a weight is given to pull $V_{OUT}$ below 30V, which is added when considering the optimization of input power. A final, fourth range corresponds to a voltage output greater than 50V. In this range, a hard constraint is violated. When $V_{OUT}$ enters this range, the controller may enter an output-only regulation mode, neglecting its primary objective of input power optimization to simply ensure that the output voltage does not rise above this maximum value. To put it another way, in this range, the controller's only goal is to pull the output voltage $V_{OUT}$ under the specified hard maximum value of 50V. It should be noted that all numeric values are provided as examples, and the code and its obvious variants may include different values specified to meet the given requirements of any system. In one sense, the pseudo-code shown in FIG. 13 may be considered one implementation of the control function shown in FIG. 10.

In the case of dynamically assigned constraints, the constraints may be automatically updated during the course of normal run-time operation based on or according to the given dynamics of the system. Dynamic constraints may be modified by the DC/DC control system itself, or they may be modified based on communication and information gathered about the larger system state. FIG. 14 provides a pseudo-code implementation of one embodiment, in which dynamic assignment of a single hard maximum output voltage constraint is made. This example may be taken in the context of FIG. 2a, in which multiple solar panels are connected in a series string, and the aggregate voltage output $V_{OUT-MAX}$ of the string may be constrained to the NEC standard 600V, or set to 588V as shown in FIG. 9. Referring to the pseudo-code in FIG. 14, upon system initialization each panel's DC/DC converter may be allocated an initial value $C_p$, which represents the hard-constrained maximum output voltage it may generate. This initial value may be equally distributed among the panels in the series string in discrete units $V_{cred}$. Each panel may be allocated $C_p = C_{pINIT} = V_{sMAX}/(V_{cred} * N)$, where 'N' is the number of panels. A dynamically assigned hard constraint may be placed on the output voltage for each panel:

$V_p<(C_p*V_{cred})$. The constraint is dynamic because $C_p$, which represents the initial value for the maximum allowed output voltage, may change during the system's run time. When the input-regulated DC/DC converter associated with the panel determines a maximum input power point which would cause the output voltage to be set to a value less than the currently allowed maximum output voltage, the converter may remains in pure input regulation mode. The converter may set its state to the maximum input power point. The difference in output voltage $V_{OUT}-(C_p*V_{cred})$ represents excess credit. This excess credit may be released in the form of discrete units of Vcred, and used by other modules within the same series-string upon request. In one sense, the pseudo-code shown in FIG. 14 may be considered one implementation of the gain function $F(V_o)$ shown in FIG. 10 as part of control function component 926.

When the panel module's input-regulated DC/DC converter determines a maximum input power point which would cause the output voltage to be set greater than the currently allowed maximum output voltage, the converter may enter pure output regulation mode. The converter may set its state as close as possible to the maximum input power point, while the output is limited by its hard constraint. Simultaneously, a communication mechanism may be used of broadcast a request for additional credit in discrete units of Vcred, which may be granted by one or more other panels in the same series-string. As previously mentioned, various embodiments of the control function disclosed herein may be implemented using digital hardware and firmware, utilizing any combination of microcontrollers and associated peripherals as shown for example in FIG. 5. That is, the control function shown in FIG. 10 may be implemented as part of control system 504, for example as part of MPPT control algorithm 512.

Figure 15:
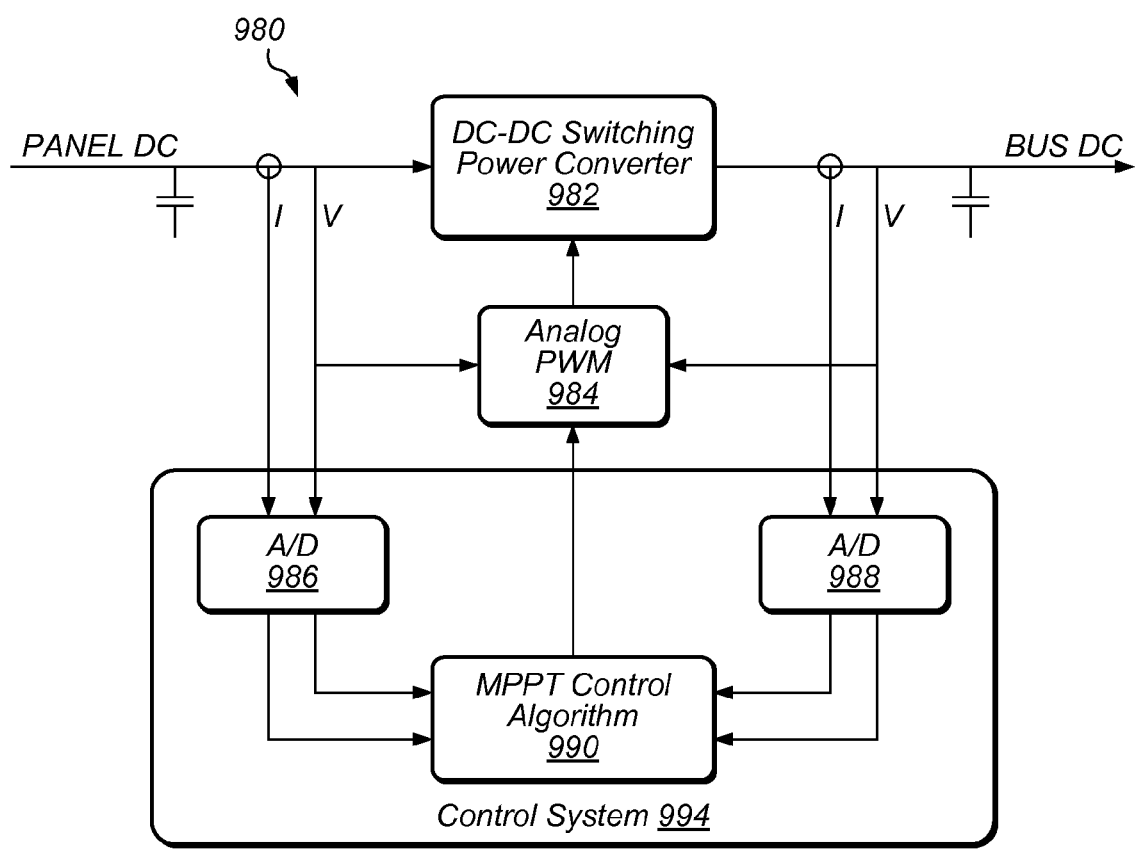
FIG. 15 shows one embodiment of a hybrid digital/analog converter architecture configurable to execute the control function shown in FIG. 10.

It should also be noted that control system 504 may be partitioned into a hybrid digital/analog system. For example, in one set of embodiments, the weighting functions for input and output regulation and the MPPT may be partitioned into different subsystems. FIG. 15 shows one possible embodiment 980 with a single power converter 982 associated with a corresponding panel. In embodiment 980, the output voltage regulation and management loop may be embedded into a microcontroller environment (including control system 994), utilizing an analog subsystem 984 for either Vin (input voltage) regulation, or a combination of weighted Vin and Vout regulation. That is, either Vin regulation, or a combination of weighted Vin and Vout regulation may be implemented as part of analog PWM control 984. Again, when MPPT control algorithm 990 within control system 994 is implemented digitally, A/D converters 986 and 988 may be used to obtain digitized values for the monitored current and voltage values. Note that, if the system is designed with a separate Vin regulation loop, the Vout regulation loop may be directly incorporated into the analog loop by incorporating a low-gain analog $V_{out}$ path into the analog PWM controller feedback (984). The system in FIG. 15 may also be designed to route the $V_{out}$ feedback through the reference control system normally associated with the MPPT control path (990), and have the $V_{out}$ regulation control implemented in microcode.

Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A controller for controlling a power converter, the controller comprising:
at least four input ports, each respective input port of the at least four input ports configured to receive a respective one of a plurality of parameters comprising:
a first parameter indicative of a value of an input current of a power converter;
a second parameter indicative of a value of an input voltage of the power converter originating from the solar panel;
a third parameter indicative of a value of an output voltage of the power converter; and
a fourth parameter indicative of a value of an output current of the power converter;
wherein the power converter is coupled between a solar panel and a voltage bus and is configured to provide an output voltage and an output current to the voltage bus, the input current originating from the solar panel; and
control circuitry configured to set a value of a control signal that controls the output voltage of the power converter, according to:
a first function corresponding to a maximum power point tracking (MPPT) signal path and configured to set a nominal value of the control signal according to a corresponding MPPT algorithm; and
a second function corresponding to an output voltage signal path of the power converter and configured to adjust the value of the control signal from the nominal value to an adjusted value that establishes a weak control path that provides a sloping output power characteristic of the power converter on either side of a flat output power characteristic of the power converter, wherein the flat output power characteristic corresponds to a preferred voltage range of the output voltage of the power converter within which the output voltage of the power converter is generated according to the nominal value of the control signal.

2. The controller of claim 1, wherein the control circuitry is configured to regulate the output voltage of the power converter according to a specified mathematical function.

3. The controller of claim 1, wherein the control circuitry is configured to regulate the input voltage of the power converter by setting a dominant value for a first control signal used for adjusting the output voltage of the power converter.

4. The controller of claim 1, wherein the control circuitry is configured to regulate the output voltage of the power converter such that the output voltage of the power converter does not exceed a specified maximum value.

5. The controller of claim 1, wherein the control circuitry is configured to regulate the input voltage of the power converter and suspend regulating the output voltage of the power converter when the output voltage of the power converter is within the preferred voltage range.

6. The controller of claim 1, wherein the control circuitry is configured to regulate output power of the power converter according to a weighted constraint corresponding to the output voltage of the power converter.

7. A controller for controlling a power converter, the control system comprising:
a sensing circuit configured to sense input current and input voltage of a power converter, and further configured to sense output voltage and output current of the power converter,
wherein the power converter is coupled between a solar panel and a voltage bus, and is configured to provide an output voltage and an output current to the voltage bus, wherein the input current and the input voltage derive from the solar panel; and control circuitry configured to set a value of a control signal that controls the output voltage of the power converter, based on:
- a first function corresponding to a maximum power point tracking (MPPT) signal path and configured to set a nominal value of the control signal according to a corresponding MPPT algorithm; and
- a second function corresponding to an output voltage signal path of the power converter and configured to adjust the value of the control signal from the nominal value to an adjusted value that establishes a weak control path that provides a respective sloping output power characteristic of the power converter on either side of a flat output power characteristic of the power converter, wherein the flat output power characteristic corresponds to a preferred voltage range of the output voltage of the power converter within which the output voltage of the power converter is generated according to the nominal value of the control signal.

8. The controller of claim 7, wherein the control circuitry is configured to regulate output power of the power converter according to a specified mathematical function corresponding to an overall output power transfer characteristic of the power converter that comprises the sloping output power characteristic and the flat output power characteristic.

9. The controller of claim 7, wherein the power converter is a switching power converter and the control signal is a pulse width modulated (PWM) signal provided as a switching signal to the power converter; and
wherein the control circuitry is configured to regulate the input voltage of the power converter by setting a dominant pulse timing corresponding to the nominal value for the (PWM) signal.

10. The controller of claim 9, wherein the first function is configured such that regulation of the input voltage of the power converter according to the MPPT algorithm causes an output of the power converter to operate as a virtual constant power port corresponding to the flat output power characteristic, wherein in controlling the output voltage of the power converter, the control circuitry is configured to adjust the dominant pulse timing of the PWM signal to provide the sloping output power characteristic at the virtual constant power port around the preferred voltage range of the output voltage of the power converter.

11. The controller of claim 7, wherein the control circuitry is configured to regulate the output voltage of the power converter such that the output voltage of the power converter does not exceed a specified maximum value.

12. The controller of claim 7, wherein the control circuitry is configured to regulate the input voltage of the power converter and suspend regulating the output voltage of the power converter when the output voltage of the power converter is within preferred voltage range.

13. A method for controlling a power converter coupled between a solar panel and a voltage bus and configured to provide an output voltage and an output current to the voltage bus, the method comprising:
monitoring input voltage and input current of the power converter;
monitoring output voltage and output current of the power converter;
setting a value of a control signal that controls the output voltage of the power converter, according to a first function corresponding to a maximum power point tracking (MPPT) signal path and configured to set a nominal value of the control signal according to a corresponding MPPT algorithm; and
adjusting the value of the control signal from the nominal value to an adjusted value according to a second function corresponding to an output voltage signal path of the power converter, wherein the adjusted value of the control signal creates a sloping output power characteristic of the power converter on either side of a flat output power characteristic of the power converter, wherein the flat output power characteristic corresponds to a preferred voltage range of the output voltage of the power converter within which the output voltage of the power converter is generated according to the nominal value of the control signal.

14. The method of claim 13, wherein said monitoring the input voltage and input current and said monitoring the output voltage and output current comprise obtaining digitized values corresponding to the input voltage and input current of the power converter and the output voltage and output current of the power converter, and using the digitized values as the parameters.

15. The method of claim 13, further comprising regulating output power of the power converter according to a specified function of the output voltage of the power converter.

16. A converter unit comprising:
a power converter having an input configured to couple to a solar panel to receive an input voltage and input current from the solar panel, and an output configured to couple to a voltage bus to provide a converter output voltage and a converter output current to the voltage bus; and
a control unit comprising:
one or more input ports, each given input port of the one or more input ports configured to receive one of a plurality of parameters comprising:
a first parameter indicative of an input current of the power converter;
a second parameter indicative of an input voltage of the power converter;
a third parameter indicative of the converter output voltage; and
a fourth parameter indicative of the converter output current; and
a controller configured to set a value of a control signal that controls the converter output voltage according to:
a first function corresponding to a maximum power point tracking (MPPT) signal path and configured to set a nominal value of the control signal according to a corresponding MPPT algorithm; and
a second function corresponding to an output voltage signal path of the power converter and configured to adjust the value of the control signal from the nominal value to an adjusted value that establishes a weak control path that provides a sloping output power characteristic of the power converter on either side of a flat output power characteristic of the power converter, wherein the flat output power characteristic corresponds to a preferred voltage range of the output voltage of the power converter within which the output voltage of the power converter is generated according to the nominal value of the control signal.

17. The converter unit of claim 16, wherein the power converter is a switching DC/DC converter.

* * * * *